United States Patent [19]

Smith

[11] Patent Number: 5,020,940

[45] Date of Patent: Jun. 4, 1991

[54] WATER-BALLASTED OIL SPILL CONTAINMENT BOOM

[76] Inventor: Lawrence R. Smith, 10126 Holly Spring, Houston, Tex. 77042

[21] Appl. No.: 466,554

[22] Filed: Jan. 17, 1990

[51] Int. Cl.⁵ .................................................. E02B 15/04
[52] U.S. Cl. .................................. 405/63; 405/68; 210/923
[58] Field of Search .................... 405/60, 63, 64, 66, 405/68, 69, 107, 115; 210/242-243, 776, 923

[56] References Cited

U.S. PATENT DOCUMENTS

| | | |
|---|---|---|
| Re. 28,966 | 9/1976 | Blockwick . |
| 2,682,151 | 6/1954 | Simpson et al. . |
| 3,476,246 | 11/1969 | Dahan .................... 210/776 |
| 3,494,132 | 2/1970 | Logan ...................... 405/68 |
| 3,533,240 | 10/1970 | Lesh ................... 405/68 X |
| 3,611,728 | 10/1971 | Van't Hof . |
| 3,641,770 | 2/1972 | Fitzgerald ........... 405/68 X |
| 3,770,627 | 11/1973 | Alquist et al. ........ 210/693 |
| 4,059,962 | 11/1977 | Milgram . |
| 4,062,191 | 12/1977 | Preus . |
| 4,112,689 | 9/1978 | Webb ...................... 405/63 |
| 4,140,424 | 2/1979 | Bretherick et al. ...... 405/68 |
| 4,143,987 | 3/1979 | Welsh ................. 405/66 X |
| 4,207,191 | 6/1980 | Webb .................. 210/242.3 |
| 4,290,714 | 9/1981 | Strange .................. 405/60 |
| 4,310,415 | 1/1982 | Webb .................. 210/242.3 |
| 4,588,501 | 5/1986 | Jordan ................... 210/109 |
| 4,752,393 | 6/1988 | Meyers .................. 210/242.3 |

FOREIGN PATENT DOCUMENTS

| | | | |
|---|---|---|---|
| 2301240 | 7/1974 | Fed. Rep. of Germany | 405/63 |
| 68413 | 4/1982 | Japan ........................ | 405/63 |
| 1188156 | 4/1970 | United Kingdom . | |
| 1383315 | 2/1975 | United Kingdom . | |
| 8300710 | 3/1983 | World Int. Prop. O. | 405/63 |

Primary Examiner—Dennis L. Taylor
Assistant Examiner—John Ricci
Attorney, Agent, or Firm—Pravel, Gambrell, Hewitt, Kimball & Krieger

[57] ABSTRACT

An elongated water ballasted oil spill containment boom made of flexible, compact, and easily storable material and having an inner and an outer chambers. When inflated with water the inner chamber assumes a substantially circular cross section and is cylindrical in shape. The selection of the ratio of the size of the outer and inner chambers controls the degree to which the boom floats above the water level and is submerged below the water level. The portions of the boom above and below the water level prevent, respectively, splashover of oil and the escape of oil under the boom. The boom is statically stable in that a strong righting moment tends to automatically properly reorient the boom in the event of undesirable wave, current or wind forces.

25 Claims, 2 Drawing Sheets

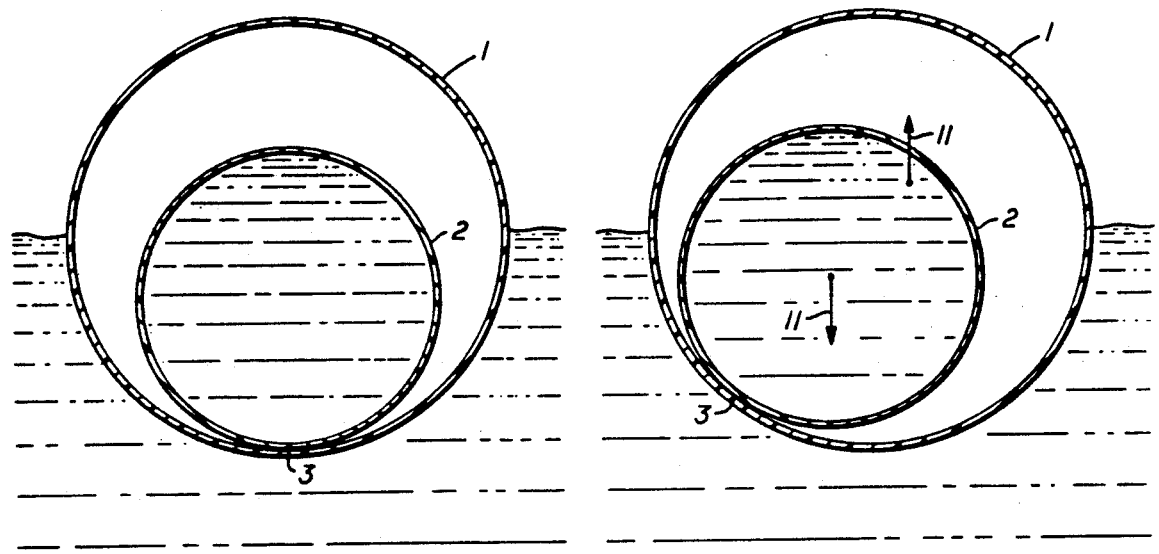
FIG. 1
FIG. 2
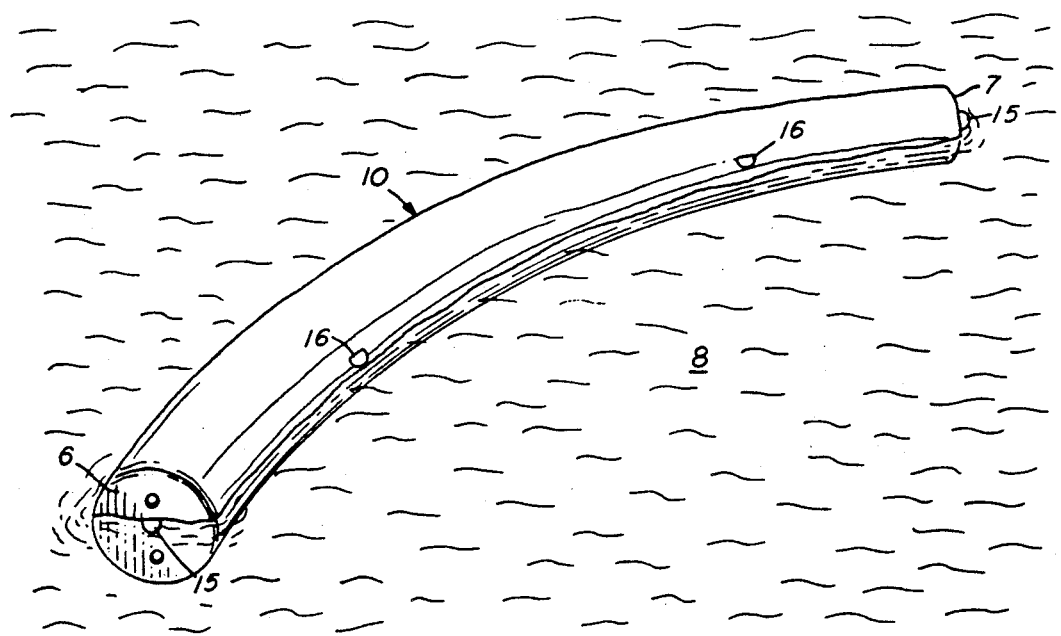
FIG. 3

WATER-BALLASTED OIL SPILL CONTAINMENT BOOM

BACKGROUND OF THE INVENTION

1. Field of the Invention

This invention relates to a flotation barrier or boom, and, more particularly, to an improved contamination control barrier or boom which can be used to contain an immiscible contaminant floating on a body of higher density liquid.

2. Description of the Prior Art

The increased contamination of bodies of water such as rivers, harbors, ponds, lakes, and oceans, by oil spills, chemical spills, and other contaminants, has created a growing need for effective containment and recovery means.

The problem is particularly acute in the case of oil spills. As the supply of oil becomes more scarce, exploration and production activities are increasingly being conducted offshore. This increases the risk of offshore oil leaks, as from blowouts or pipe failure. In addition, seagoing tankers with storage capacities of millions of gallons are employed in transporting crude oil and refined petroleum products.

Hydrocarbon liquids constitute a dangerous source of pollution, since they have densities lower than that of water and will float on and spread over wide areas of water. Apart from being a fire hazard in the shipping lanes, these floating liquids can seriously pollute nearby land areas. The devastating environmental and legal implications of liquid hydrocarbon spills on a body of water are well known.

The effectiveness of recovery of an oil spill is maximized, and the damage to the environment minimized, by confining the contaminant to as small an area as possible. This requires that the containment operations be implemented as soon as possible after the occurrence of the spill.

Methods for removing hydrocarbon liquids and restoring the quality of the water to desired characteristics include the use of chemical additives to cause a change in the characteristics of the oil; the use of various materials to absorb the oil from the water; and the use of confining devices and recovery means to prevent spread of the oil and remove the oil from the surface of the water.

Floating barriers, known generally as oil booms, have been found to have great utility in containing and controlling oil slicks and other water carried pollutants on bodies of water. The barriers usually contain flotation elements having a liquid impervious skirt which, when deployed, provide means for containing the pollutant or preventing the pollutant from spreading into uncontaminated areas.

A large variety of barriers or booms are utilized to separate the contaminated area from adjacent uncontaminated areas. A common characteristic of oil spill booms is that they are designed to float in the water with part of their structure above and part of their structure below the water level. The portion above the water level serves to contain the floating oil and prevent splashover of the oil. The portion below the water surface serves to contain the oil below the surface and prevents oil from escaping under the barrier.

Typical of such oil containment booms are those described in U.S. Pat. Nos. 3,476,246 and 4,062,191. Both patents disclose a boom comprising a series of inflatable air tubes to provide buoyancy and a weighted skirt to serve as an underwater barrier and to preserve the orientation of the boom. The devices are fairly complicated and have rigid components. This renders them expensive to manufacture and cumbersome to store and deploy.

Another type of boom, disclosed in U.S. Pat. No. Re. 28,966, obviates the need for using a weighted skirt. This boom comprises a structure having a buoyant upper section and a water absorbing lower section. While eliminating the need for weighted skirts, this boom still suffers from being rigid and complex, and thus expensive to manufacture and cumbersome to store and deploy.

Yet another type of oil boom is disclosed in British Pat. Nos. 1,188,156 and 1,383,315 and U.S. Pat. Nos. 4,140,424, 4,112,689, 4,207,191, and 4,310,415. All disclose variations or improvements of an oil boom comprising two chambers made of a flexible material. Prior to use, the barriers can be rolled up and packed into a relatively small space for transport and storage. Upon deployment, one chamber is inflated with water while the other is inflated with air and each chamber takes on a substantially cylindrical shape. The two cylindrical chambers, being connected to each other at a point on their circumferences so as to form a figure eight cross section, then forms a barrier with the water chamber being under the water line and the air chamber floating above the water line.

While this type of boom is inexpensive to manufacture and can be easily stored and easily and rapidly deployed, it suffers from being limited to use in calm conditions. This disadvantage comes about from the fact that the figure eight configuration of the air and water chambers lacks the orientational stability required to withstand wave and wind action while maintaining the effectiveness of the barrier. British Pat. No. 1,188,156 discloses that the barrier behaves particularly well when the underwater portion has neutral buoyancy. However, a neutrally buoyant water chamber will not, when perturbed, normally orient itself vertically downward. Rather, the chamber will shift from side to side in response to even moderate wave or current action. The result will be an air chamber which stays above the water level but a water chamber which easily shifts position under the water.

SUMMARY OF THE INVENTION

Accordingly, it is an object of the present invention to provide an improved contamination control boom arrangement which can confine a film of oil to within a predetermined area under the environmental influences of strong winds, waves and currents.

It is an object of the present invention to provide an improved contamination control boom arrangement which is rugged, flexible, light, compact, and with a long storage life requiring virtually no maintenance for easy storage and rapid deployment from a ships, boats or aircraft.

It is a further object of the present invention to provide an oil containment system and barrier which exhibits roll, pitch, and heave characteristics closely approximating the sea conditions affecting the oil spill, thereby responding to, and moving in conformity with, the movements of the sea at the sea surface.

It is yet another object of the present invention to provide an improved contamination control boom arrangement which is simple and inexpensive to manufacture and which can be easily recovered and disposed of properly.

Other objects and advantages of the present invention will become apparent from the following detailed description taken in connection with the accompanying drawings.

The above and other objects of the present invention are achieved, according to a preferred embodiment thereof, by providing a contamination control boom of the type adapted to contain a contaminant in a preselected location of a body of liquid.

The invention is of an inflatable barrier for confining material floating on a body of liquid, typically oil floating on water. The barrier or boom comprises two elongated chambers, made of flexible materials, with one chamber being disposed within the other and with the chambers connected to each other at a common line.

Prior to use the barrier is stored in a folded or rolled-up configuration. The boom is deployed by inflating the two chambers with two materials of different densities. Typically, one of the chambers is inflated with water while the other is inflated with air. The fully inflated boom, with chambers assuming substantially cylindrical shapes, will float on the body of liquid with a portion of the outer chamber above the liquid level and the balance below the liquid level. For simplicity, the contaminant to be contained will be referred to primarily as oil and the liquid on which the oil floats will be referred to primarily as water.

The extent to which the outer chamber will float above the water level, assuming full inflation of both chambers, will depend to a large degree on the size ratio of the outer and inner chambers, the densities of the inflating media, and to a lesser degree, the density of the chamber wall materials. The absolute size of the outer chamber will be determined by the magnitude of the expected splashover of oil and the extent of escape of oil under the barrier. These will, in turn, be determined by the size of the oil spill, the type of oil, and the expected weather and sea conditions.

The boom is made of materials which are impervious to water and air. The materials are flexible so as to facilitate storage of the boom on a spool or drum, or folded in a container. The boom is simple and inexpensive to manufacture. This makes it possible to store a relatively large number of booms in strategic locations, such as at harbors, along busy sea lanes, on harbor boats, and on oil tankers. It also makes it possible economically to dispose of the boom after use, eliminating the costly job of cleaning, reconditioning and otherwise restoring the boom to an operational status.

The boom is deployed by inflating the two chambers with appropriate media. Typically this would mean sea water in one chamber and air in the other. While the invention would work in the same way regardless of which chamber is inflated with which medium, for simplicity, in what follows, we will assume that it is the inner chamber which is inflated with water while the outer chamber is inflated with air. Inflation of the chambers can be accomplished by several means.

Any number of booms can be connected together to form a barrier of any practical desired length. The booms may be anchored to better confine the boom to a particular location.

Unlike devices incorporating rigid components, the boom is very simply and inexpensively constructed and uses flexible materials, which facilitates easy storage and rapid deployment. While retaining these advantages, the boom is also orientationally stable in the water, maintaining its configuration in the water in the face of adverse water and wind conditions.

BRIEF DESCRIPTION OF THE DRAWINGS

The above and other embodiments of the present invention may be more fully understood from the following detailed description, when taken together with the accompanying drawing wherein similar reference characters refer to similar elements throughout, and in which:

FIG. 1 is a cross sectional view of the boom showing the two chambers;

FIG. 2 is a cross sectional view of the boom showing the two chambers in a dynamically unstable position;

FIG. 3 is a longitudinal view of the boom showing inlet ports for the two chambers.

DESCRIPTION OF THE PREFERRED EMBODIMENTS

Figures 4, 5:
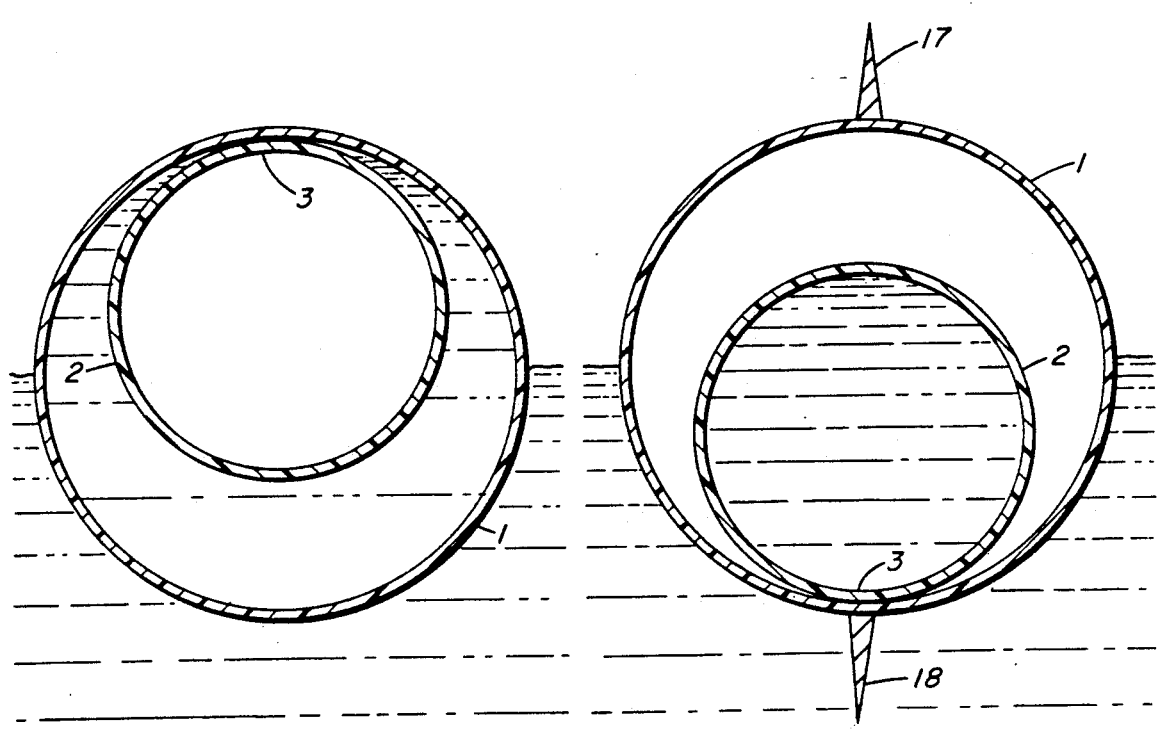
FIG. 4 is a cross sectional view of the boom showing the two chambers as in FIG. 1 but with the outer chamber being filled with a denser medium than the inner chamber.
FIG. 5 is a cross sectional view of the boom showing the two chambers as in FIG. 1 but with fin-like structures above and below the outer chamber.

Referring now to the drawing, FIGS. 1, 2, 3, 4 and 5 illustrate the preferred embodiments of the present invention of a contamination control boom generally designated 10. The boom comprises an outer chamber 1 and a plurality of inner chambers, preferably a single inner chamber 2. When inflated, the inner chamber 2 and outer chamber 1 assume substantially circular cross-sectional shapes. The chambers extend the length of the boom 10 and, when inflated, assume substantially cylindrical shapes 1 and 2. The two chambers are connected to each other at a point on their circumferences 3. The connection extends along a line beginning near the front end of the boom 6 and ending at the back end of the boom 7.

To deploy the boom, one of the two chambers 1 or 2 is inflated with a material having a density as high as or higher than that of the liquid on which the boom is to be deployed 8. The other chamber 2 or 1 is inflated with a material having a density which is lower than that of the liquid on which the boom is to be deployed 8. The liquid on which the boom is to be deployed 8 can be any liquid on which it is desired to contain a contaminant but is usually water. The tubes can be inflated with a variety of materials, including foam, various gases, or a variety of liquids, but are most preferably inflated with air and water. While the invention works in the same way regardless of which chamber is filled with which medium, for purposes of this description it is assumed that the inner chamber 2 is inflated with water while the outer chamber 1 is inflated with air. While FIG. 1, 2, and 5 show the boom with an inner tube filled with the denser medium, FIG. 4 shows the tube with the outer tube filled with the denser medium.

By "inflation" is meant the admittance of inflating media, preferably air or water, as appropriate, in such quantities as to confer to the boom the desired mechanical properties. Means for inflating the air chamber can include, but are not limited to, air blowers or compressors, compressed bottle gas release, preferably through the use of chemical reactions activated by contact with water and releasing gases into the air chamber. Means for inflating the water chamber include, but are not limited to, pumping, and, preferably, towing the boom through the water 8 in such a way as to allow water to enter the water chamber through a one-way check valve.

The inner chamber 2 and outer chamber 3 can run the full length of the boom 10 or one or both chambers can be partitioned and segmented horizontally so that a plurality of chambers are present in each boom. Segmenting or compartmentalizing the tubes into smaller sections can make the boom less susceptible to deflation resulting from a puncture. The disadvantage is that means must be provided for the separate inflation of the various segments.

The boom may be deployed in a number of configurations. The outer chamber 1 may contain one or more inner chambers 2, as desired. Independently, several booms can be connected together side-by-side using some appropriate means 16 to provide a barrier with increased breadth. Because of its flexibility and compactness during storage, each boom may reach a length of 500 feet or more. In some applications, it may be desirable to have a still longer boom. This can be easily accomplished by connecting a number of booms in an end-to-end configuration to form an extended boom. To accommodate this, the near end 6 and far end 7 of the boom can be equipped with means for attaching adjoining booms 15 so as to form an extended containment barrier.

The material of construction of the boom must be impervious to water, oil and air. The material should preferably also be fire resistant or fire retardant to increase its effectiveness in the event of a hydrocarbon fire. The material should preferably have a high strength, be resistant to abrasion, puncture, and chemical degradation, yet have a low density. These desirable attributes may be achieved by proper selection of the material forming the chamber walls, or, alternatively by proper coating and sealing of the material of construction with appropriate sealants. The type of coating or sealant used or its size is not critical as long as it will prevent oil, water, or air from passing through the wall materials.

The material must be sufficiently flexible so as to allow the compact rolling or folding of the boom prior to use on a spool or drum or into a container.

The boom can be manufactured by any convenient means. Two means of manufacture are preferred. According to one means, two sheets of flexible material are joined together to produce the required configuration. Combining two or more sheets can be accomplished by use of appropriate adhesives or mechanical techniques such as sewing. In the preferred means for manufacturing, a single sheet of flexible material is folded and a single seam is made at a common point 3 on the circumference and is continued horizontally for the entire length of the boom 10 thereby creating both the inner 2 and outer 1 chambers.

The boom of this invention is designed so that when deployed it floats partially submerged so that a portion of the outer chamber extends above the water level while the balance of the outer chamber lies beneath the water level. The precise determination of the extent to which the boom is submerged requires the consideration of the exact shapes of the inflated inner 2 and outer 1 chambers, the densities and volume of the chamber walls with any coating, the density of the materials injected into the inner and outer chambers, e.g. the water and air, and the density of the water on which the boom is deployed 8.

Without in any way limiting the scope of this invention, the extent to which the floating boom will be submerged can be easily calculated using some simplifying assumptions. If it is assumed that the chamber wall materials have a density identical with that of the water on which the boom is deployed 8, or, at least, that the volume and thus the mass of the chamber walls is negligible in relation to the volume and weight of the water in the water chamber 2, and if it is further assumed that the water in the water chamber 2 is of the same density as the body of water on which the boom is deployed 8, and if it is further assumed that the inner 2 and outer 1 chambers are each sufficiently inflated so as to assume a substantially circular cross sectional appearance, and, finally, if it is assumed that the density of the air in the air chamber 1 is so small as to render the weight of the air in the air chamber 1 negligible in comparison with the weight of the water in the water chamber 2, then one can calculate the degree to which the boom will ride submerged in the water as a function of the ratio of the size of the outer and inner chambers.

The result is that, $$h/D = 0.5 \{1 - \cos(\pi/x^2)\}$$

where, h is the location of the surface of the body of water on which the boom is deployed 8 measured from the lowest point of the outer chamber up to the level of the surface of the body of water;

D is the diameter of the outer chamber 1; and x is the ratio of the radius (or equivalently, the diameter) of the outer shell 1 of the boom to the inner chamber 2.

Using the above equation, it is possible to estimate the degree of submersion of the boom as a function of the ratio of outer to inner chamber diameters. The table below shows some of the results obtained using the equation. For example, when only a single water chamber is used ($x = 1.0$), h/D equals 1.00, i.e., the single water chamber rides completely submerged with its highest point at the water surface. Similarly, when the outer diameter is much larger than the diameter of the inner chamber, the water level would occur very near the bottom of the boom, with h/D and thus h approaching zero. It would often be desirable to have the boom float approximately half-way submerged. From the table, it appears that such a level of submersion could be achieved with an outer to inner diameter ratio of approximately 1.4 to 1.5.

| x | h/D |
|---|---|
| 1.0 | 1.000 |
| 1.1 | 0.928 |
| 1.2 | 0.787 |
| 1.3 | 0.642 |
| 1.4 | 0.516 |
| 1.5 | 0.413 |
| 1.6 | 0.332 |
| 1.7 | 0.267 |
| 1.8 | 0.217 |
| 1.9 | 0.178 |
| 2.0 | 0.146 |
| 2.1 | 0.122 |
| 2.2 | 0.102 |
| 2.3 | 0.086 |
| 2.4 | 0.073 |

| x | h/D |
|---|---|
| 2.5 | 0.062 |
| 2.6 | 0.053 |
| 2.7 | 0.046 |
| 2.8 | 0.040 |
| 2.9 | 0.034 |
| 3.0 | 0.030 |

The absolute size of the boom, as distinguished from the ratio of the sizes of the outer and inner diameters, is selected based on considerations of the type of service to which the boom will be put and the type of environment in which it is expected to function. Specifically, the portion of the boom above the water level should extend sufficiently to effectively prevent the splashover of oil from the confined area to the unconfined uncontaminated area. Similarly, the portion of the boom below the surface should extend sufficiently to effectively prevent the oil from escaping the confined area by going under the barrier.

It may be desirable to extend the boom in either the upward or downward directions, or in both directions, by including rigid or semi-rigid fin-like structures at the highest point 17, the lowest point 18, or at both the highest and lowest points of the boom structure. So long as such structures are planar they should not materially degrade the highly desirable feature of the boom of being capable of being stored in a folded or spooled fashion.

Deployment of the boom is designed to be rapid and simple. As soon as possible following the occurrence of an oil spill, booms stored on oil tankers, on harbor vessels, or in onshore facilities are brought to the site of the spill. The boom, rolled onto spools or folded into containers is allowed to unroll or unfold and all but one end of the boom is cast onto the water.

The chambers of the boom are inflated with the inflating media using any appropriate means, typically air and water. Inflation can occur through entry of the inflation media near the front end 6 of the boom, or use the rear end 7 of the boom, or at any convenient point or points along the length of the boom 10. Several booms can be connected to each other end-to-end to form a longer barrier. Any of a variety of inflation means may be used. Inflation of the buoyant chamber can be accomplished using gas blowers or compressors, compressed gas bottles, or through the activation of chemical reactions producing gases. Air inflation is conveniently achieved by means of an air pump powered by compressed gas or other power source.

The inflation of the nonbuoyant chamber can be accomplished through the use of pumps, or preferably by towing the boom through the water and allowing water to enter the water chamber through a one-way check valve which will not permit the water, once in the water chamber, to leave. Pressure relief means should preferably be provided to prevent either chamber from overinflating.

For a small enough spill it may be possible to completely surround the spill with barriers. For larger spills, it may only be practical to place a series of booms so as to block the progress of the oil spill in certain directions.

The boom of this invention may have associated with it any appropriate means for recovering the confined oil, or the boom may be used alone without an associated recovery means. When used alone, the boom of this invention would serve the function of rapidly confining a fresh spill to a limited location. With the spill so contained, time would be available to bring into play other means for more permanently confining and for recovering the spilled oil. It is envisioned that, because the boom of this invention is relatively inexpensive and capable of being stored in a compact configuration, and because the boom is rapidly deployed, one or more such booms will be available for deployment soon after, preferably within a few hours after, an oil spill. The rapid deployment will confine the bulk of the spill to a relatively small area before it has had a chance to spread to adjoining areas. More permanent confining means, along with recovery means, could then be brought to the site of the spill over the next day or two following the spill and efficiently deployed on the oil which had been confined by the boom of this invention.

Upon completion of its task, the boom can be easily deflated by the opening of the valves or through deliberate puncturing of the chambers. The deflated boom can then be easily retrieved and disposed of in an appropriate manner. The disposability of the boom enhances its value in that it obviates the need for the cumbersome, slow and expensive cleaning and reconditioning which is required following the use of other types of oil containment booms.

Apart from being inexpensive and compact, the boom of this invention has the additional advantage of being highly stable when deployed in a wide range of weather conditions. The boom of this invention has considerably more static stability than the water ballasted figure eight system disclosed in the prior patents.

The static stability of the boom is determined by the relative position of the center of gravity of the boom, its center of buoyancy, and the surface of the water. Should the boom be raised out of the water and then dropped back in, or be rolled to the side by wave, current or wind forces, as shown in FIG. 2, a strong righting moment 11 will develop which will tend to reestablish the proper orientation of the boom, thereby stabilizing the structure and preventing oil from escaping the confined area either above or below the barrier.

This concludes the description of the preferred embodiments of applicant's invention. Those skilled in the art may find many variations and adaptations thereof, and all such variations and adaptations, falling within the true scope and spirit of applicant's invention, are intended to be covered thereby.

What is claimed is:

1. An inflatable barrier for confining a first liquid floating on a second liquid comprising:
   (a) an outer elongated chamber having means for inflation with an outer chamber fluid medium;
   (b) at least one inner chamber within said outer chamber having means for inflation with an inner chamber fluid medium having a density different from that of said outer chamber fluid medium;
   (c) whereby, after both said inner and said outer chambers have been inflated with fluid media, said barrier will float on said second liquid with a portion of said barrier sufficiently exposed above the surface of said second liquid as to prevent splashover of said first liquid, and with a portion of said barrier sufficiently submerged as to prevent said first liquid from escaping under said barrier.

2. The barrier of claim 1 wherein said first liquid includes non-liquid materials mixed with it.

3. The barrier of claim 1 wherein said first liquid is hydrocarbons.

4. The barrier of claim 1 wherein said second liquid is water.

5. The barrier of claim 1 wherein said first liquid is hydrocarbons and said second liquid is water.

6. The barrier of claim 5 wherein said inner chamber is disposed longitudinally within said outer chamber.

7. The barrier of claim 5 wherein said inner chamber will be cylindrical in shape upon inflation.

8. The barrier of claim 5 wherein said inner chamber medium is selected from the group consisting of gas and foam and said outer chamber medium is selected from the group consisting of water, brine, and sea water.

9. The barrier of claim 5 wherein said outer chamber medium is selected from the group consisting of gas and foam and said inner chamber medium is selected from the group consisting of water, brine, sea water and oil.

10. The barrier of claim 5 wherein said inner chamber medium is air and said outer chamber medium is sea water.

11. The barrier of claim 10 wherein said air is injected by a method selected from the group consisting of mechanical air blowing, compressed air bottle release, and gaseous release by chemical reaction.

12. The barrier of claim 10 wherein said water is injected by a method selected from the group consisting of pumping, and towing through the water.

13. The barrier of claim 5 wherein said outer chamber medium is air and said inner chamber medium is sea water.

14. The barrier of claim 13 wherein said air is injected by a method selected from the group consisting of mechanical air blowing, compressed air bottle release, and gaseous release by chemical reaction.

15. The barrier of claim 13 wherein said water is injected by a method selected from the group consisting of pumping, and towing through the water.

16. The barrier of claim 5 further comprising means for attaching a plurality of said barriers in an end-to-end fashion so as to form a lengthened barrier.

17. The barrier of claim 5 further comprising means for attaching a plurality of said barriers in a side-by-side fashion so as to form a broadened barrier.

18. The barrier of claim 5 wherein said flexible materials are selected from the group consisting of man-made plastics, fiber reinforced plastics, and natural fibers coated so as to be impervious to water, air and oil.

19. The barrier of claim 5 wherein the ratio of the diameters of said outer to said inner chamber ranges from about 1.1 to about 3.0.

20. The barrier of claim 5 wherein the diameter of said outer chamber ranges from about 2 to about 20 feet.

21. The barrier of claim 5 further comprising a means for preventing splashover extending from the highest point in said boom.

22. The barrier of claim 5 further comprising a means for preventing escape of oil under said barrier extending from the lowest point in said boom.

23. The barrier of claim 5 further comprising a means for preventing splashover extending from the highest point in said boom and preventing escape of oil under said barrier extending from the lowest point in said boom.

24. An inflatable barrier for confining material floating on a body of liquid, as in claim 1, wherein the size relationship between said inner and outer chambers is expressed by the mathematical equation:

$$h/D = 0.5 \{1 - \cos(/X^2)\}$$

where,
- h is the location of the surface of the body of water on which the boom is deployed measured from the lowest point of the outer chamber up to the level of the surface of the body of water;
- D is the diameter of the outer chamber; and
- X is the ratio of the radius or the diameter of the outer shell of the boom to the inner chamber.

25. A method for confining a first liquid floating on a second liquid, using an inflatable barrier, which comprise the steps of:
   (a) placing said barrier on said second liquid, said barrier comprising:
      (i) an outer elongated chamber having means for inflation with an outer chamber fluid medium;
      (ii) at least one inner chamber within said outer chamber having means for inflation with an inner chamber fluid medium having a density different from that of said outer chamber fluid medium;
      (iii) whereby, after both said inner and said outer chambers have been inflated with fluid media, said barrier will float on said second liquid with a portion of said barrier sufficiently exposed above the surface of said second liquid as to prevent splashover of said first liquid, and with a portion of said barrier sufficiently submerged as to prevent said first liquid from escaping under said barrier; and
   (b) inflating said barrier so as to allow said barrier to float partly submerged on said second liquid.

* * * * *